United States Patent
Huang et al.

(10) Patent No.: US 9,407,425 B1
(45) Date of Patent: Aug. 2, 2016

(54) METHOD AND DEVICE FOR COMPENSATING PHASE IMBALANCE

(71) Applicant: Beken Corporation, Shanghai (CN)

(72) Inventors: Yiming Huang, Shanghai (CN); Weifeng Wang, Shanghai (CN)

(73) Assignee: BEKEN CORPORATION, Shanghai (CN)

( * ) Notice: Subject to any disclaimer, the term of this patent is extended or adjusted under 35 U.S.C. 154(b) by 0 days.

(21) Appl. No.: 14/730,205

(22) Filed: Jun. 3, 2015

(30) Foreign Application Priority Data

May 14, 2015 (CN) .............................. 201510246119

(51) Int. Cl.
*H04L 7/00* (2006.01)
*H04L 7/027* (2006.01)

(52) U.S. Cl.
CPC ................ *H04L 7/007* (2013.01); *H04L 7/027* (2013.01)

(58) Field of Classification Search
CPC ...... H01Q 3/267; H04B 17/101; H04B 17/14; H04L 27/3863
USPC ................................................. 375/295, 371
See application file for complete search history.

(56) References Cited

U.S. PATENT DOCUMENTS

| | | | | |
|---|---|---|---|---|
| 7,177,372 B2* | 2/2007 | Gu | ........................... | H03C 3/40 375/296 |
| 7,925,217 B2* | 4/2011 | Park | ....................... | H04B 17/21 455/226.1 |
| 8,619,916 B2* | 12/2013 | Jong | .................... | H04L 27/3863 375/322 |
| 2002/0048326 A1* | 4/2002 | Sahlman | ............... | H03F 1/3229 375/297 |
| 2004/0203472 A1* | 10/2004 | Chien | ....................... | H04B 1/30 455/68 |
| 2006/0252392 A1* | 11/2006 | Beamish | ................ | H01Q 3/267 455/126 |

OTHER PUBLICATIONS

Sao-Jie Chen, Yong-Hsiang Hsieh, An Auto-I/Q Calibrated Modulator, IQ Calibration techniques for CMOS Radio Transceivers, 2006, pp. 53-67, Springer.

* cited by examiner

*Primary Examiner* — Freshteh N Aghdam
(74) *Attorney, Agent, or Firm* — Perkins Coie LLP

(57) ABSTRACT

A method of compensating phase imbalance comprises, detecting power outputs of a first output signal related to a first phase compensation value and of a second output signal related to a second phase compensation value; calculating a first absolute difference between an in-phase value and a quadrature value of the power output of the first output signal; calculating a second absolute difference between an in-phase value and a quadrature value of the power output of the second output signal; determining a minimum difference by comparing the first absolute difference with the second absolute difference; determining an optimal phase compensation value and a suboptimal phase compensation value from the first and the second phase compensation values according to the minimum difference; and obtaining an updated optimal phase compensation value with a binary search algorithm.

11 Claims, 13 Drawing Sheets

METHOD AND DEVICE FOR COMPENSATING PHASE IMBALANCE

CROSS REFERENCE TO RELATED APPLICATION

This application claims priority to Chinese Application No. 201510246119.1 entitled "Method and device for compensating phase imbalance," filed on May 14, 2015 by Beken Corporation, which is incorporated herein by reference.

TECHNICAL FIELD

The present application relates to circuits, and more particularly but not exclusively to a method and a device for compensating phase imbalance.

BACKGROUND

With the development of integrated circuit technology, transmitters with direct up-conversion transmitter architectures are used more and more frequently. However, such kind of transmitters may have in-phase (I) and quadrature (Q) branch imbalance, and deteriorate system performance. A conventional method requires both the transmitter and receiver to participate in the I/Q imbalance compensation, which is complicated and has a large power consumption. It is desirable to effectively solve the I/Q imbalance problem.

SUMMARY OF THE INVENTION

According to an embodiment of the invention, a method of compensating phase imbalance comprises, detecting power outputs of a first output signal related to a first phase compensation value and of a second output signal related to a second phase compensation value; calculating a first absolute difference between an in-phase value and a quadrature value of the power output of the first output signal; calculating a second absolute difference between an in-phase value and a quadrature value of the power output of the second output signal; determining a minimum difference by comparing the first absolute difference with the second absolute difference; determining an optimal phase compensation value and a suboptimal phase compensation value from the first and the second phase compensation values according to the minimum difference; and obtaining an updated optimal phase compensation value with a binary search algorithm.

According to an embodiment of the invention, a circuit for compensating phase imbalance comprises a power detector configured to detect power outputs of a first output signal related to a first phase compensation value and of a second output signal related to a second phase compensation value; a controller, configured to calculate a first absolute difference between an in-phase value and a quadrature value of the power output of the first output signal; calculate a second absolute difference between an in-phase value and a quadrature value of the power output of the second output signal; determine a minimum difference by comparing the first absolute difference with the second absolute difference; determine an optimal phase compensation value and a suboptimal phase compensation value from the first and the second phase compensation values according to the minimum difference; and obtain an updated optimal phase compensation value with a binary search algorithm.

With the embodiments of the invention, the process of compensating in-phase and quadrature branches phase imbalance does not require the participation of the whole receiver. Further the phase compensation is purely digital, and does not require the participation of an analog part of a transmitter. Further, the method and device according to embodiments of the invention may be easy to operate, and the calibration result is stable and accurate.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Various aspects and examples of the invention will now be described. The following description provides specific details for a thorough understanding and enabling description of these examples. Those skilled in the art will understand, however, that the invention may be practiced without many of these details. Additionally, some well-known structures or functions may not be shown or described in detail, so as to avoid unnecessarily obscuring the relevant description.

Figure 1:
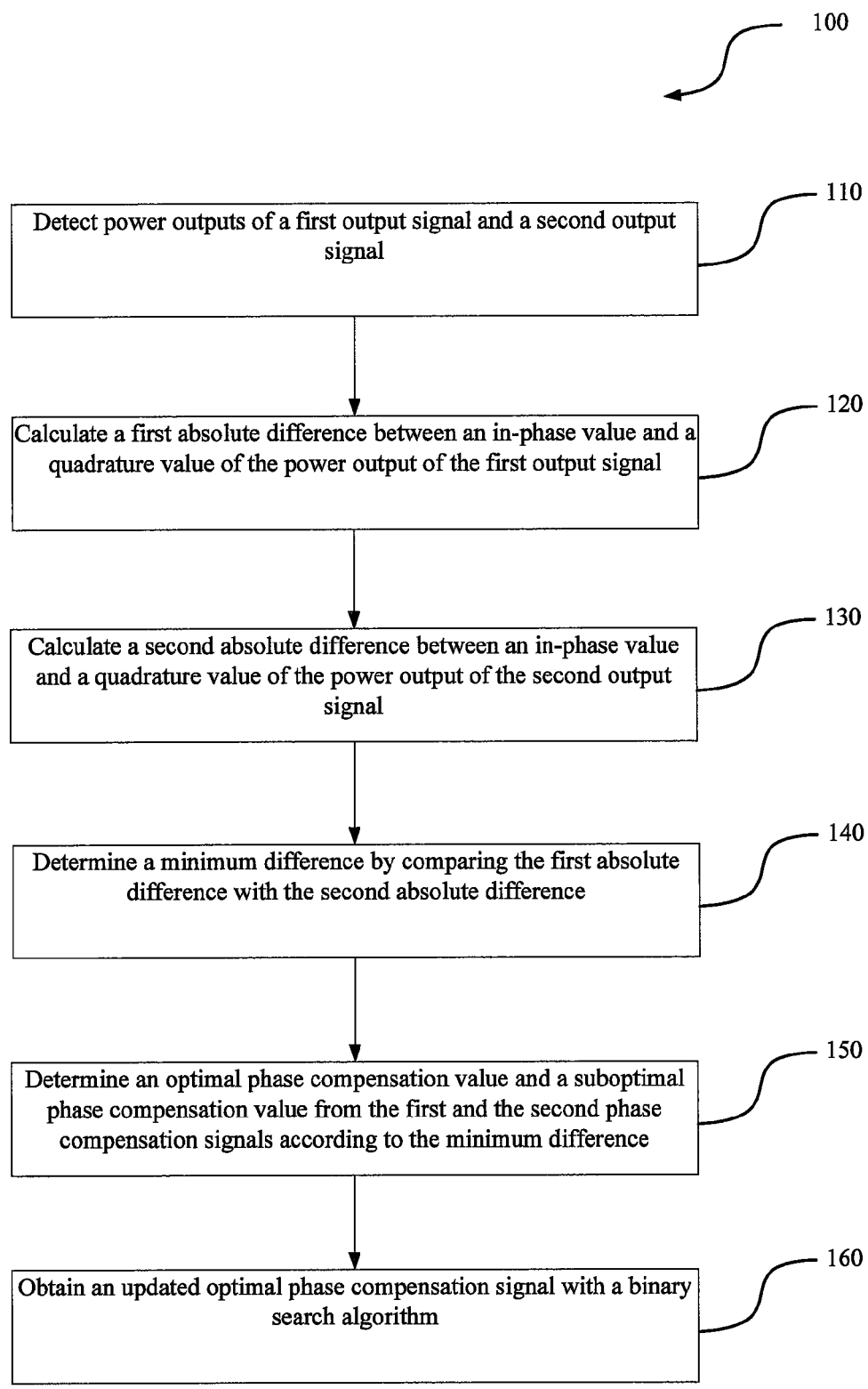
FIG. 1 is a flow chart diagram illustrating an embodiment of a method of compensating phase imbalance.

FIG. 1 is a flow chart diagram illustrating an embodiment of a method 100 of compensating phase imbalance. The method 100 comprises detecting, in block 110, power outputs of a first output signal related to a first phase compensation value and of a second output signal related to a second phase compensation value. The power outputs of the first output signal comprises rf_dectect_ip_1, rf_dectect_in_1, rf_dectect_q_p_1, and rf_dectect_q_n_1. The power outputs of the second output signal comprises rf_dectect_i_p_2, rf_dectect_i_n_2, rf_dectect_q_p_2, and rf_dectect_q_n_2.

Then the method 100 calculates, in block 120, a first absolute difference rf_detect_iq_diff_abs_1 between an in-phase value rf_detect_i_1 and a quadrature value rf_detect_q_1 of the power output of the first output signal (rf_dectect_i_1, rf_dectect_i_n_1, rf_dectect_q_p_1, and rf_dectect_q_n_1).

Then the method 100 calculates, in block 130, a second absolute difference rf_detect_iq_diff_abs_2 between an in-phase value rf_detect_i_2 and a quadrature value rf_detect_q_2 of the power output of the second output signal (rf_dectect_i_p_2, rf_dectect_i_n_2, rf_dectect_q_p_2, and rf_dectect_q_n_2).

Then the method 100 determines, in block 140, a minimum difference rf_detect_min by comparing the first absolute difference rf_detect_iq_diff_abs_1 with the second absolute difference rf_detect_iq_diff_abs_2.

Then the method 100 determines, in block 150, an optimal phase compensation value phase_cal_optimal and a suboptimal phase compensation value phase_cal_sub_optimal from the first and the second phase compensation values (PHASE_CAL_INI_P and PHASE_CAL_INI_N) according to the minimum difference rf_detect_min which is determined in block 140.

The method 100 further obtains, in block 160, an updated optimal phase compensation value using a binary search algorithm. Details of the method 100 will be discussed below with reference to the following drawings 2A-7.

Figure 2A:
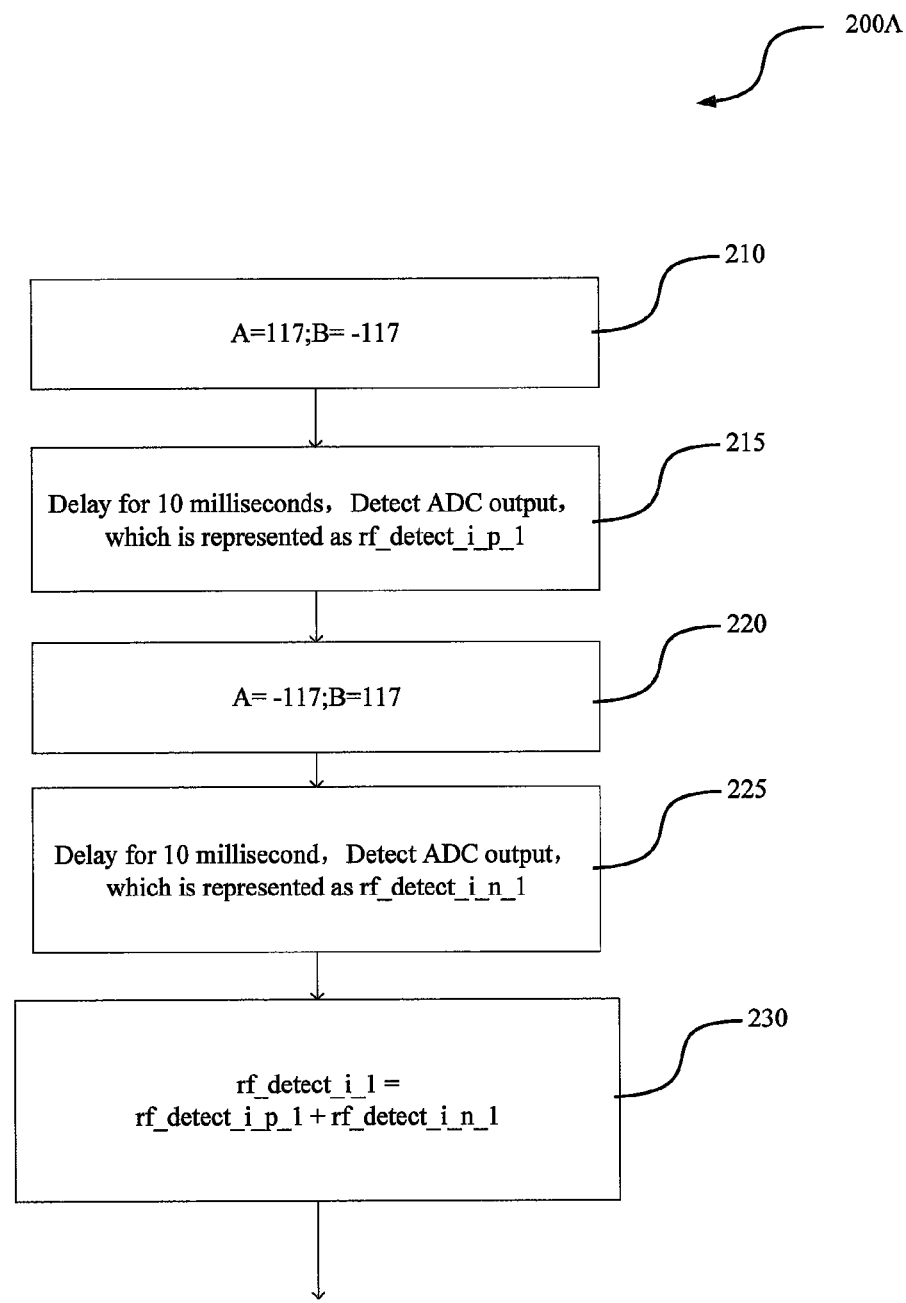
FIG. 2A is a flow chart illustrating an embodiment of a method of how the in-phase value rf_dectect_i_1 of the first output signal is obtained.

FIG. 2A is a flow chart illustrating an embodiment of a method 200A of how the in-phase value rf_dectect_i_1 of the first output signal is obtained.

First, a power output of a first weighted signal rf_dectect_i_p_1 is detected. The first weighted signal rf_dectect_i_p_1 is weighted by the first phase compensation value PHASE_CAL_INI_P.

To be specific, in block 210, an in-phase branch I of a first signal to be compensated is weighted with a constant A, and a quadrature branch Q of the first signal to be compensated is weighted with a constant B. For example, A equals 117 and B equals −117.

Then in block 215, after a delay for about 10 milliseconds, an ADC output is detected, which can be represented as rf_detect_i_p_1. Note the delay value of 10 milliseconds is only for illustrative purpose, those having ordinary skill in the art can change the delay value according to practical application.

Then, in block 220, an in-phase branch I of the first signal to be compensated is weighted with a constant A, and a quadrature branch Q of the first signal to be compensated is weighted with a constant B. For example, A equals −117 and B equals 117.

Then, in block 225, after delay for about 10 milliseconds, an ADC output is detected, which can be represented as rf_detect_i_n_1, which represents a power output of a second weighted signal rf_dectect_n_1. The second weighted signal rf_dectect_n_1 is also weighted by the first phase compensation value PHASE_CAL_INI_P. Note the delay value of 10 milliseconds is only for illustrative purpose, those having ordinary skill in the art can change the delay value according to practical application.

Then in block 230, the in-phase value rf_dectect_i_1 of the power output of the first output signal is calculated by adding the power output of the first weighted signal rf_dectect_i_p_1 and the power output of the second weighted signal rf_dectect_i_n_1, that is rf_detect_i_1=rf_detect_i_p_1+rf_detect_i_n_1.

Figure 2B:
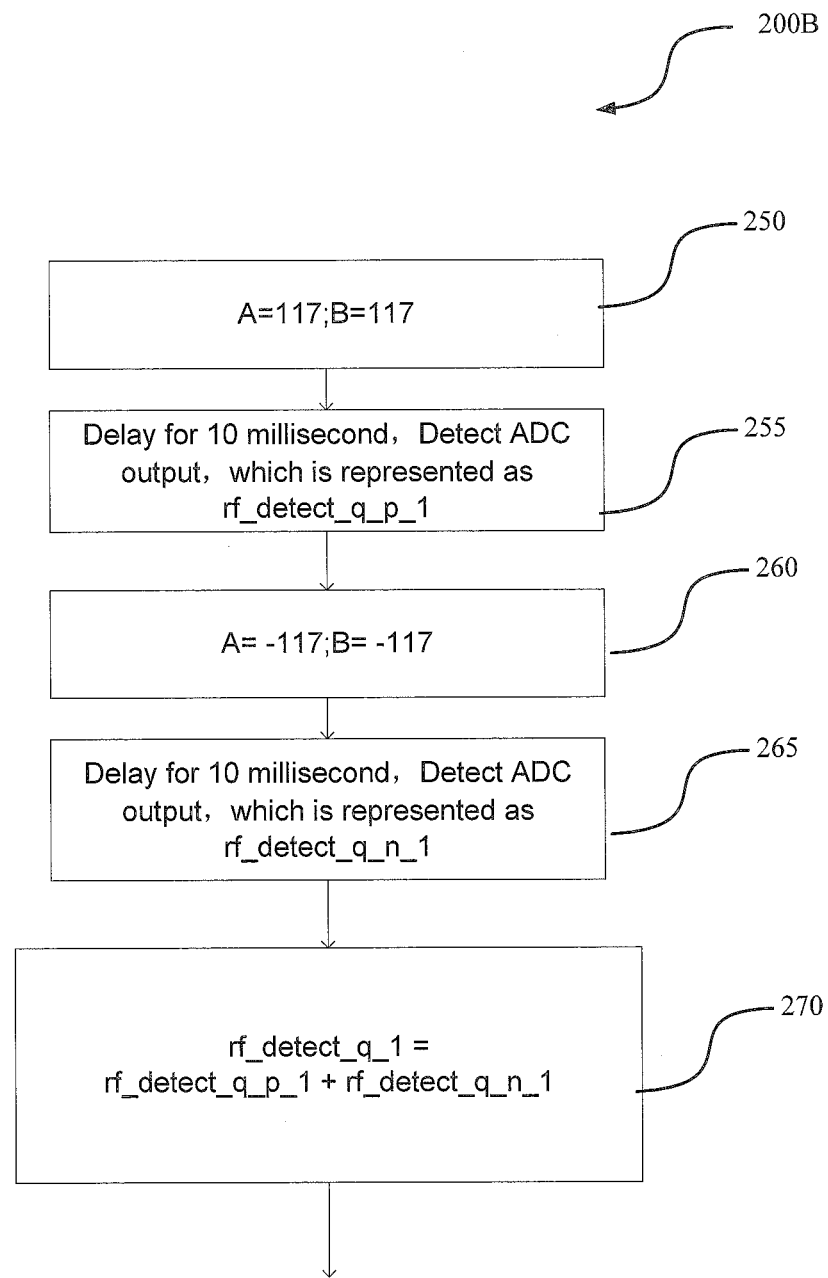
FIG. 2B is a flow chart illustrating an embodiment of a method of how the quadrature value rf_dectect_q_1 of the first output signal is obtained.

FIG. 2B is a flow chart illustrating an embodiment of a method 200B on how the quadrature value rf_dectect_q_1 of the first output signal is obtained.

First, a power output of a third weighted signal rf_dectect_q_p_1 is detected. The third weighted signal rf_dectect_q_p_1 is weighted by the first phase compensation value PHASE_CAL_INI_P.

To be specific, in block 250, an in-phase branch I of the first signal to be compensated is weighted with a constant A, and a quadrature branch Q of the first signal to be compensated is weighted with a constant B. For example, A equals 117 and B equals 117.

Then in block 255, after a delay for about 10 milliseconds, an ADC output is detected, which can be represented as rf_detect_qp_1. Note the delay value of 10 milliseconds is only for illustrative purpose, and those having ordinary skill in the art can change the delay value according to practical application.

Then, in block 260, the in-phase branch I of the first signal to be compensated is weighted with a constant A, and a quadrature branch Q of the first signal to be compensated is weighted with a constant B. For example, A equals −117 and B equals −117.

Then, in block 265, after a delay for about 10 milliseconds, an ADC output is detected, which can be represented as rf_detect_q_n_1, which represents a power output of the fourth weighted signal rf_dectect_q_n_1. The fourth weighted signal rf_dectect_q_n_1 is weighted by the first phase compensation value PHASE_CAL_INI_P. Note the delay value of 10 milliseconds is only for illustrative purpose, and those having ordinary skill in the art can change the delay value according to practical application.

Then, in block 270, the quadrature value rf_detect_q_1 of power output of the first output signal is calculated by adding the power output of the third weighted signal rf_dectect_q_p_1 and the power output of the fourth weighted signal rf_dectect_q_n_1, that is rf_detect_q_1=rf_detect_q_p_1+rf_detect_q_n_1.

Note in FIGS. 2A and 2B, in order to calculate in-phase value, A and B are inverse to each other, while in order to calculated quadrature value, A equals B. However, the absolute value of A and B should be the same.

Figure 3A:
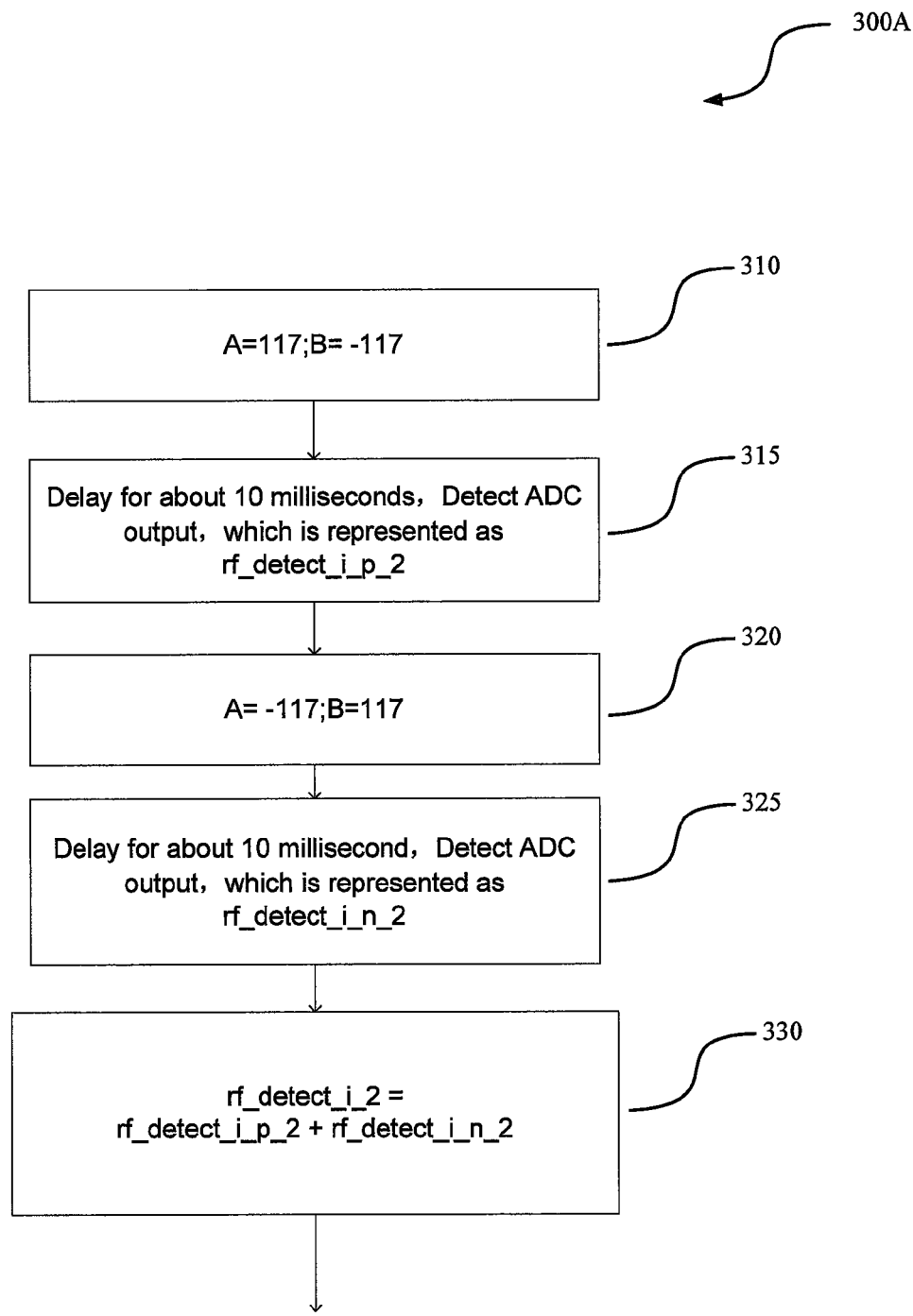
FIG. 3A is a flow chart illustrating an embodiment of a method of how the in-phase value rf_dectect_i_2 of the second output signal is obtained.

FIG. 3A is a flow chart illustrating an embodiment of a method of how the in-phase value rf_dectect_i_2 of the second output signal is obtained.

First, a power output of a fifth weighted signal rf_dectect_i_p_2 is detected. The fifth weighted signal rf_dectect_i_p_2 is weighted by the second phase compensation value PHASE_CAL_INI_N.

To be specific, in block 310, an in-phase branch I of a second signal to be compensated is weighted with a constant A, and a quadrature branch Q of the first signal to be compensated is weighted with a constant B. For example, A equals 117 and B equals −117.

Then in block 315, after a delay for about 10 milliseconds, an ADC output is detected, which can be represented as rf_detect_i_p_2, which represents the power output of the fifth weighted signal. Note the delay value of 10 milliseconds is only for illustrative purpose, and those having ordinary skill in the art can change the delay value according to practical application.

Then, in block 320, an in-phase branch I of the second signal to be compensated is weighted with a constant A, and a quadrature branch Q of the second signal to be compensated is weighted with a constant B. For example, A equals −117 and B equals 117.

Then, in block 325, after a delay for about 10 milliseconds, an ADC output is detected, which can be represented as rf_detect_i_n_2, which represents a power output of a sixth weighted signal rf_dectect_i_n_2. The sixth weighted signal rf_dectect_i_n_2 is also weighted by the second phase compensation value PHASE_CAL_INI_N. Note the delay value of 10 milliseconds is only for illustrative purpose, and those having ordinary skill in the art can change the delay value according to practical application.

Then in block 330, the in-phase value rf_dectect_i_2 of the power output of the second output signal is calculated by adding the power output of the fifth weighted signal rf_dectect_i_p_2 and the power output of the sixth weighted signal rf_dectect_n_2, that is rf_detect_i_2=rf_detect_i_p_2+rf_detect_i_n_2.

Figure 3B:
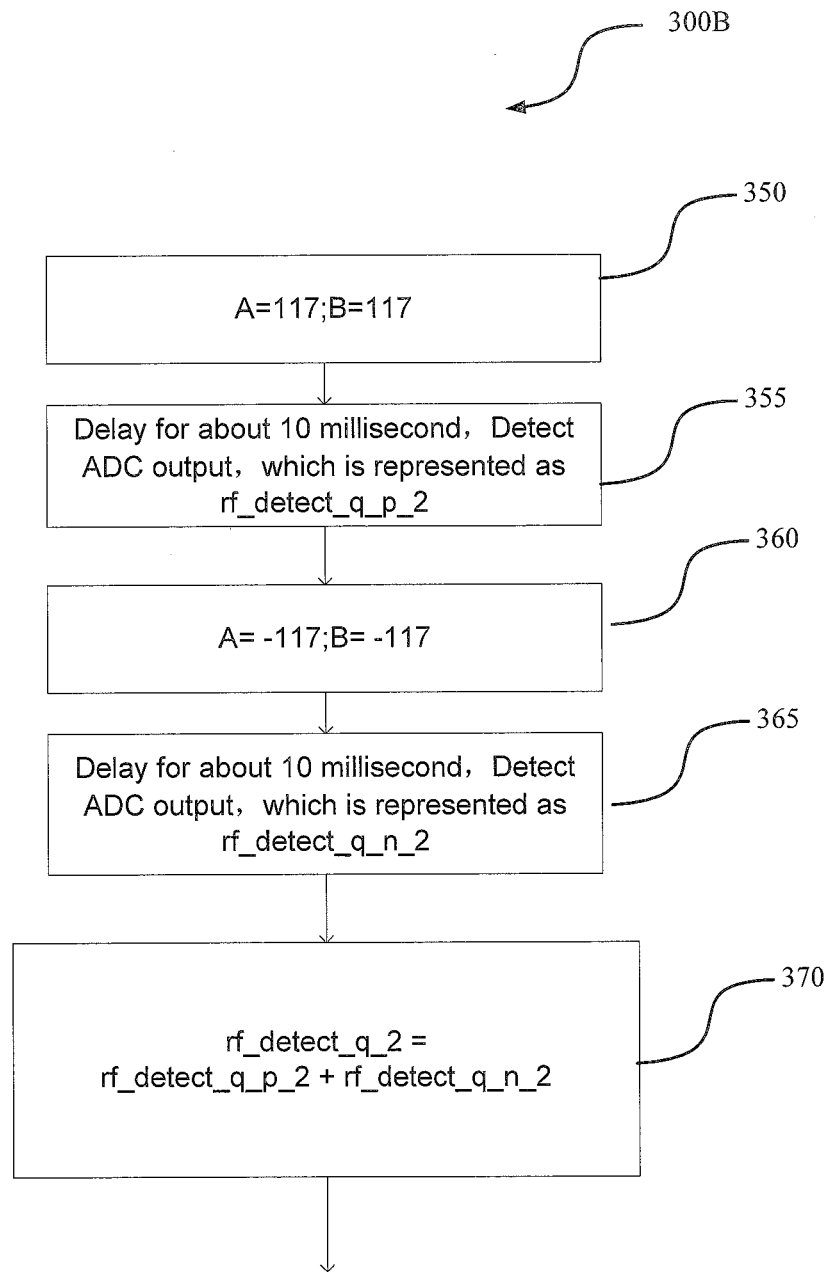
FIG. 3B is a flow chart illustrating an embodiment of a method of how the quadrature value rf_dectect_q_2 of the second output signal is obtained.

FIG. 3B is a flow chart illustrating an embodiment of a method of how the quadrature value rf_dectect_q_2 of the second output signal is obtained.

First, a power output of a seventh weighted signal rf_dectect_q_p_2 is detected. The seventh weighted signal rf_dectect_q_p_2 is weighted by the second phase compensation value PHASE_CAL_INI_N.

To be specific, in block 350, an in-phase branch I of the second signal to be compensated is weighted with a constant A, and a quadrature branch Q of the second signal to be compensated is weighted with a constant B. For example, A equals 117 and B equals 117.

Then in block 355, after a delay for about 10 milliseconds, an ADC output is detected, which can be represented as rf_detect_q_p_2. Note the delay value of 10 milliseconds is only for illustrative purpose, and those having ordinary skill in the art can change the delay value according to practical application.

Then, in block 360, an in-phase branch I of the second signal to be compensated is weighted with a constant A, and a quadrature branch Q of the second signal to be compensated is weighted with a constant B. For example, A equals −117 and B equals −117.

Then, in block 365, after a delay for about 10 milliseconds, an ADC output is detected, which can be represented as rf_detect_q_n_2, which represents a power output of the eighth weighted signal rf_dectect_q_n_2. The eighth weighted signal rf_dectect_q_n_2 is weighted by the second phase compensation value PHASE_CAL_ INI_N. Note the delay value of 10 milliseconds is only for illustrative purpose, and those having ordinary skill in the art can change the delay value according to practical application.

Then, in block 370, the quadrature value rf_detect_q_2 of power output of the second output signal is calculated by adding the power output of the seventh weighted signal rf_dectect_qp_2 and the power output of the eighth weighted signal rf_dectect_q_n_2.

Figure 4A:
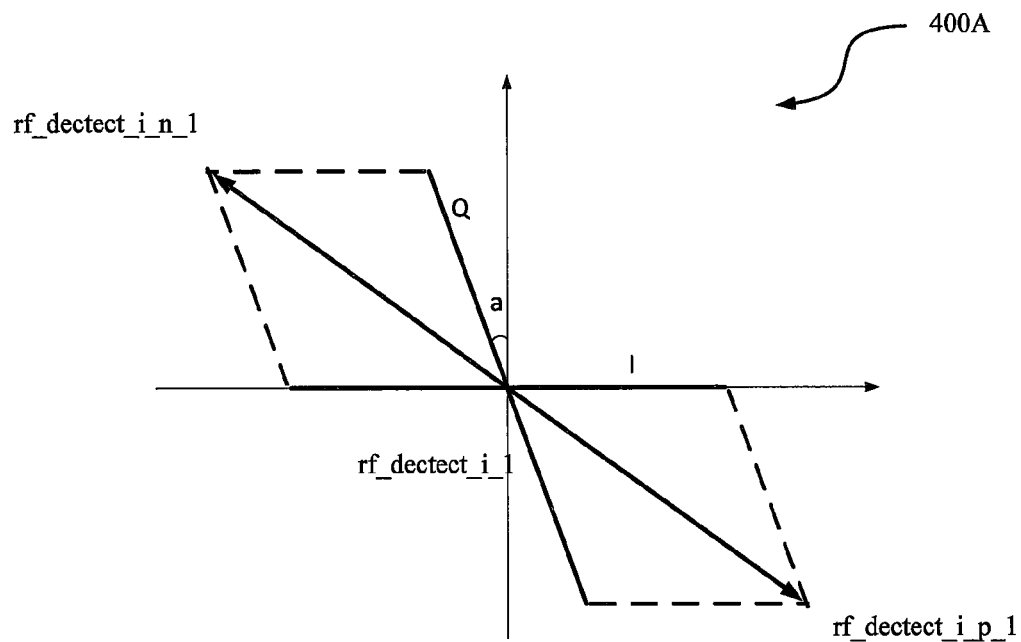
FIG. 4A is a geometric diagram of an embodiment illustrating how the in-phase value rf_dectect_i_1 of the first output signal is obtained.

FIG. 4A is a geometric diagram of an embodiment illustrating how the in-phase value rf_dectect_i_1 of the first output signal is obtained. From FIG. 4A, it can be clearly seen from 400A that rf_dectect_i_1 equals the addition of the first weighted signal rf_dectect_i_p_1 and the second weighted signal rf_dectect_i_n_1.

Figure 4B:
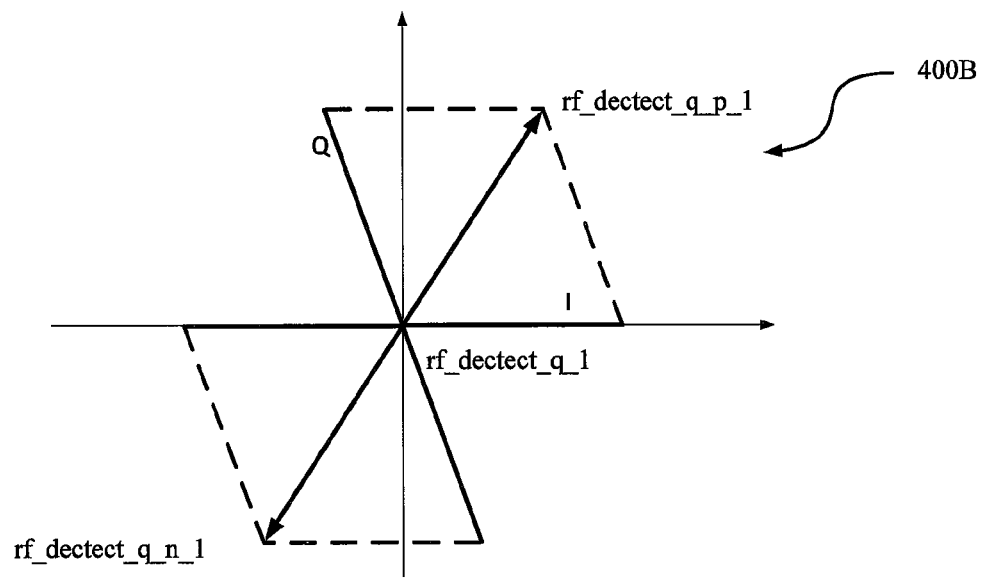
FIG. 4B is a geometric diagram of an embodiment illustrating how the quadrature value rf_dectect_q_1 of the first output signal is obtained.

FIG. 4B is a geometric diagram of an embodiment illustrating how the quadrature value rf_dectect_q_1 of the first output signal is obtained. From FIG. 4B, it can be clearly seen from 400B that rf_dectect_q_1 equals the addition of the third weighted signal rf_dectect_q_p_1 and the fourth weighted signal rf_dectect_q_n_1. A phase imbalance angle can be illustrated as an angle a in FIGS. 4A and 4B.

Figure 5A:
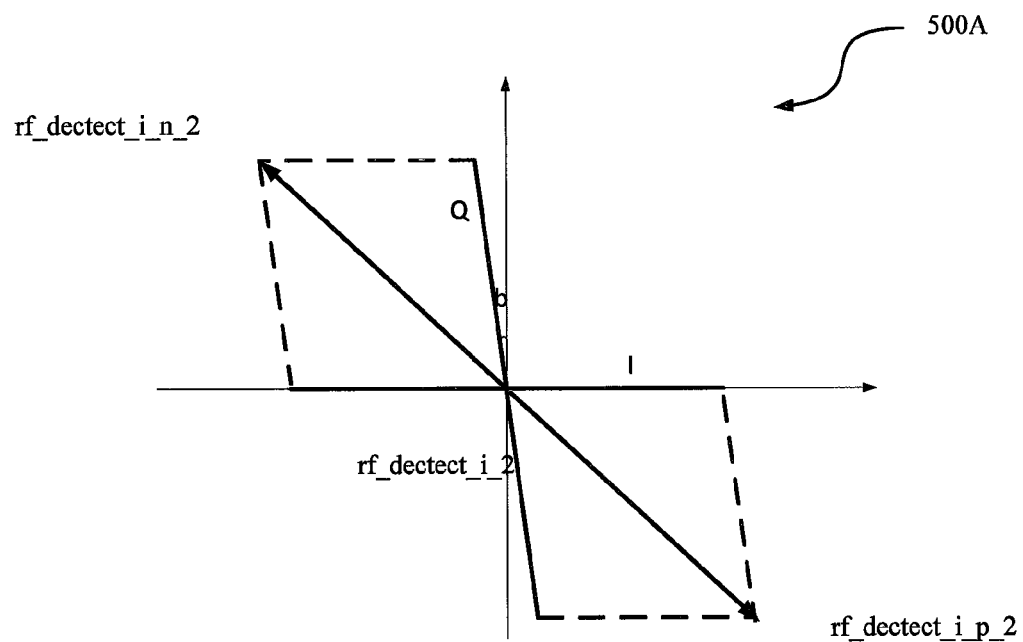
FIG. 5A is a geometric diagram of an embodiment illustrating how the in-phase value rf_dectect_i_2 of the second output signal is obtained.

FIG. 5A is a geometric diagram of an embodiment illustrating how the in-phase value rf_dectect_i_2 of the second output signal is obtained. From 500A, it can be clearly seen that rf_dectect_i_2 equals the addition of the fifth weighted signal rf_dectect_i_p_2 and the sixth weighted signal rf_dectect_n_2.

Figure 5B:
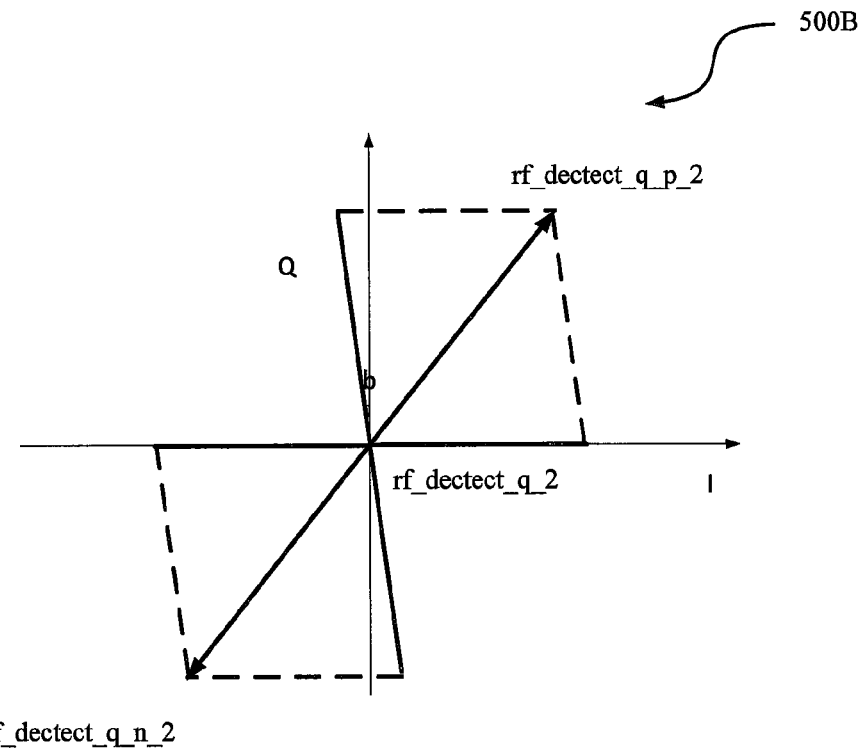
FIG. 5B is a geometric diagram of an embodiment illustrating how the quadrature value rf_dectect_q_2 of the second output signal is obtained.

FIG. 5B is a geometric diagram of an embodiment illustrating how the quadrature value rf_dectect_q_2 of the second output signal is obtained. From 500B, it can be clearly seen that rf_dectect_q_2 equals the addition of the seventh weighted signal rf_dectect_q_p_2 and the eighth weighted signal rf_dectect_q_n_2. A phase imbalance angle can be illustrated as an angle b in FIGS. 4A and 4B. Compared with FIGS. 4A and 4B, the phase imbalance angle b is smaller than the phase imbalance angle a, that is the phase compensation value corresponding to angle b should be selected as the optimal phase compensation value.

Figure 6A:
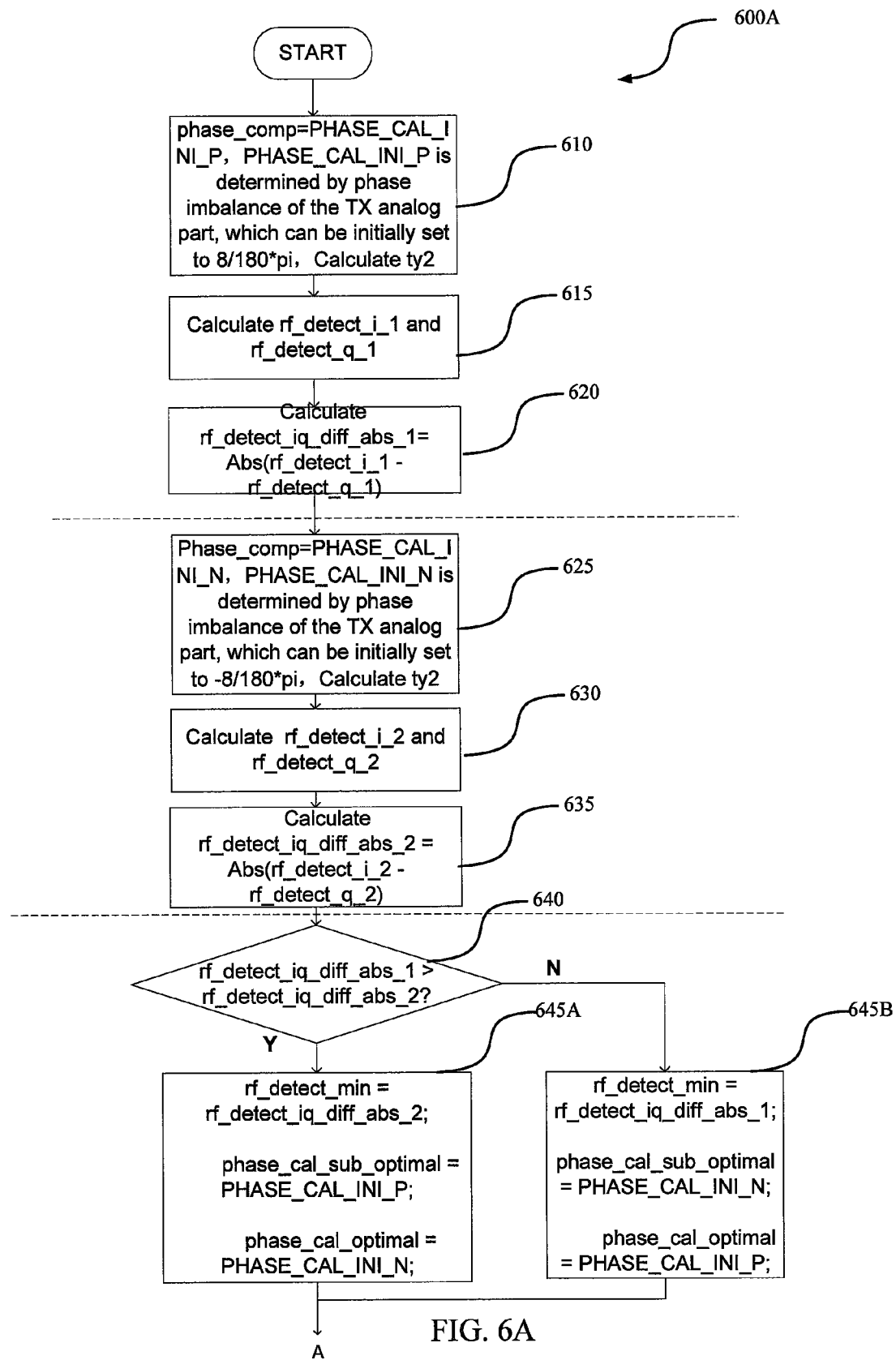
FIG. 6A is a flow chart illustrating an embodiment of a method of compensating phase imbalance.

FIG. 6A is a flow chart illustrating an embodiment of a method 600A of one part of operation for compensating phase imbalance.

The method 600A comprises in block 610, assigning a first phase compensation value phase_comp=PHASE_CAL_INI_P, wherein PHASE_CAL_INI_P is determined by phase imbalance of the an analog part of the transmitter, which can be initially set to 8/180*pi, which can also be represented as 8/180×π, and calculating ty2. ty2 can be calculated based on the equation:

$$ty2 = 1 + \tfrac{1}{2} * (\text{phase\_comp}^2) + \tfrac{3}{8} * (\text{phase\_comp}^4) \quad (1)$$

Then the method 600A, in block 615, further calculates rf_detect_i_1 and rf_detect_q_1. The detailed method of calculating rf_detect_i_1 and rf_detect_q_1 can be referred to in FIG. 2A and FIG. 2B and their corresponding descriptions respectively.

Then the method 600A calculates, in block 620, a first absolute difference rf_detect_iq_diff_abs_1 between an in-phase value and a quadrature value of the power output of the first output signal, which can be represented as rf_detect_iq_diff_abs_1=Abs(rf_detect_i_1−rf_detect_q_1), which means that the first absolute difference rf_detect_iq_diff_abs_1 equals an absolute difference between the in_ phase value rf_detect_i_1 and the quadrature value rf_detect_q_1.

The method 600A comprises in block 625, assigning second phase compensation value phase_comp=PHASE_CAL_INI_N, wherein PHASE_CAL_INI_N is determined by phase imbalance of the an analog part of the transmitter, which can be initially set to −8/180*pi, which can also be represented as −8/180×π, and calculating ty2. ty2 can be calculated based on the above equation (1).

Then the method 600A, in block 630, further calculates rf_detect_i_2 and rf_detect_q_2. The detailed method of calculating rf_detect_i_2 and rf_detect_q_2 can be referred to FIG. 3A and FIG. 3B and their corresponding descriptions respectively.

Then the method 600A calculates, in block 635, a second absolute difference rf_detect_iq_diff_abs_2 between an in-phase value and a quadrature value of the power output of the second output signal, which can be represented as rf_detect_iq_diff_abs_2=Abs(rf_detect_i_2−rf_detect_q_2), which means that the second absolute difference rf_detect_iq_diff_abs_2 equals an absolute difference between the in_phase value rf_detect_i_2 and the quadrature value rf_detect_q_2.

Then the method 600A compares, in block 640, the first absolute difference rf_detect_iq_diff_abs_1 with the second absolute difference rf_detect_iq_diff_abs_2, so as to determine a minimum difference rf_detect_min.

If the first absolute difference rf_detect_iq_diff_abs_1 is bigger than the second absolute difference rf_detect_iq_diff_abs_2, which means YES to the determining block 640, the method 600A proceeds with block 645A, wherein rf_detect_min=rf_detect_iq_diff_abs_2. Further, phase_cal_optimal=PHASE_CAL_INI_N, and phase_cal_sub_optimal=PHASE_CAL_INI_P.

If the first absolute difference rf_detect_iq_diff_abs_1 is smaller or equals the second absolute difference rf_detect_iq_diff_abs_2, which means NO to the determining block 640, the method 600A proceeds with block 645B, wherein rf_detect_min=rf_detect_iq_diff_abs_1. Further, phase_cal_sub_optimal=PHASE_CAL_INI_N; phase_cal_optimal=PHASE_CAL_INI_P.

That means the phase compensation value which is corresponding to the minimum difference is assigned as the optimal phase compensation value, while the phase compensation value which is corresponding to the subminimum difference is assigned as the suboptimal phase compensation value.

Figure 6B:
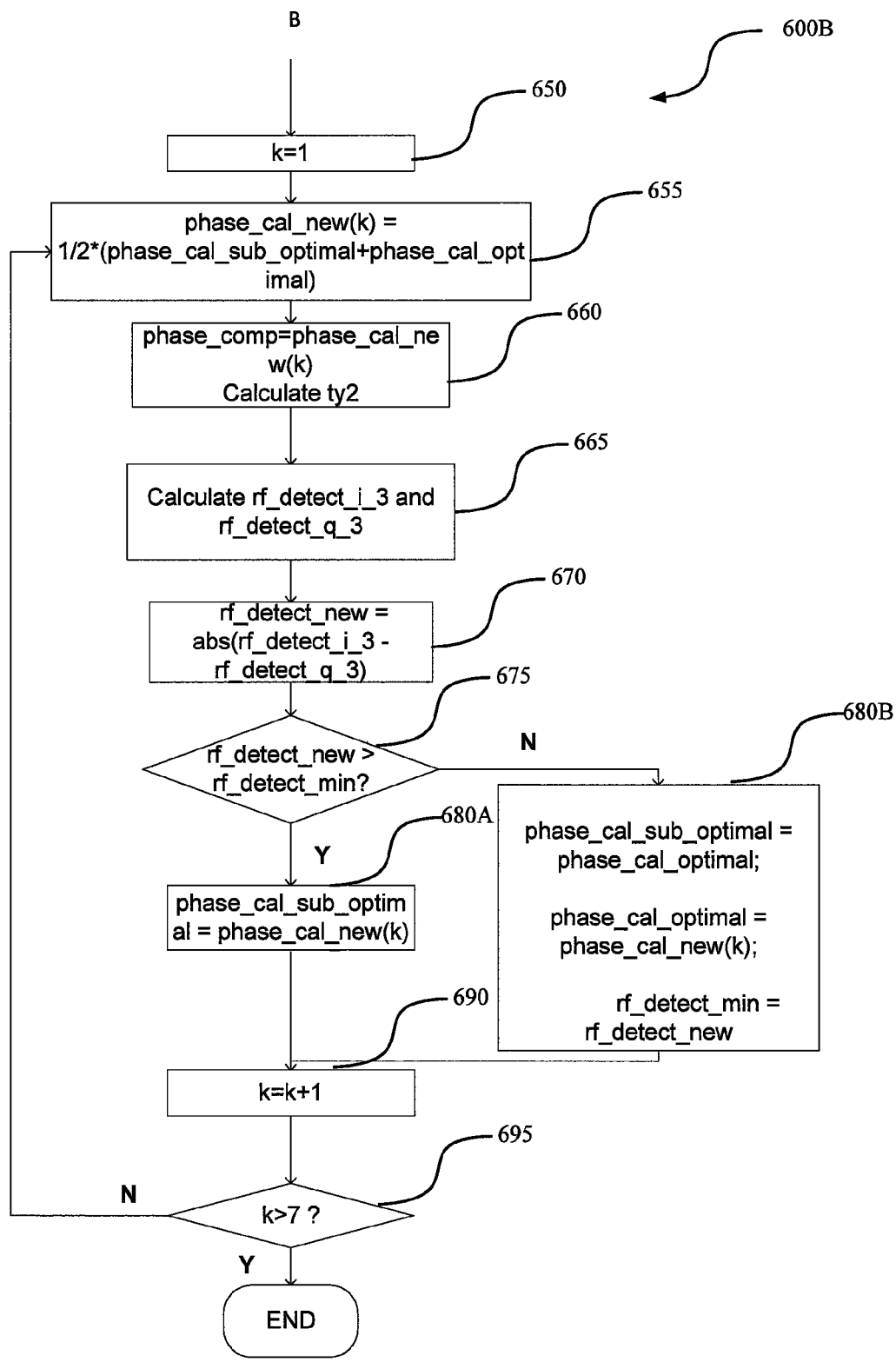
FIG. 6B is a flow chart illustrating an embodiment of a method of the other part of operation for compensating phase imbalance.

Method 600A ends with A, which is followed by B in method 600B of FIG. 6B. FIG. 6B is a flow chart illustrating an embodiment of a method 600B of the other part of operation for compensating phase imbalance. The method 600B obtains an updated optimal phase compensation value with a binary search algorithm.

To be specific, the method 600B first assigns 1 to a variable k, and k represents a count for iteration in the method.

Then the method 600B calculates in block 655, an average phase compensation value of both a current optimal phase compensation value and a current suboptimal phase compensation value, which can be represented as phase_cal_new(k)=½*(phase_cal_sub_optimal+phase_cal_optimal).

Then the method 600B assigns, in block 660, the average phase compensation value to an updated phase compensation value phase_comp, that is, phase_comp is phase_comp=phase_cal_new(k).

The method 600B further calculates in block 660, an updated ty2. Note ty2 will be applied to the Q branch of the signal to be compensated, so as to compensate phase imbalance between Q branch and I branch of the signal.

Then the method 660B calculates, in block 665, an in-phase value and a quadrature value of the power output of the third output signal, that is rf_detect_i_3 and rf_detect_q_3. Note the third output signal is compensated based on the phase_cal_new(k).

The method 660B then calculates in bock 670, third absolute difference between an in-phase value and a quadrature value of the power output of the third output signal, which can be represented as rf_detect_new=abs(rf_detect_i_3 rf_detect_q_3).

Then the method 660B compares in block 675, the third absolute difference rf_detect_new with the previous determined minimum difference rf_detect_min, so as to determine an updated minimum difference.

If the third absolute difference rf_detect_new is bigger than the previous determined minimum difference rf_detect_min, which means YES to the determining block 675, the method 600B proceeds with block 680A, wherein phase_cal_sub_optimal=phase_cal_new(k).

If the third absolute difference rf_detect_new is smaller or equals the previous determined minimum difference rf_detect_min, which means NO to the determining block 675, the method 600B proceeds with block 680B, wherein phase_cal_sub_optimal=phase_cal_optimal; phase_cal_optimal=phase_cal_new(k); rf_detect_min=rf_detect_new, which means the minimum difference has been changed to the third absolute difference.

Figure 7:
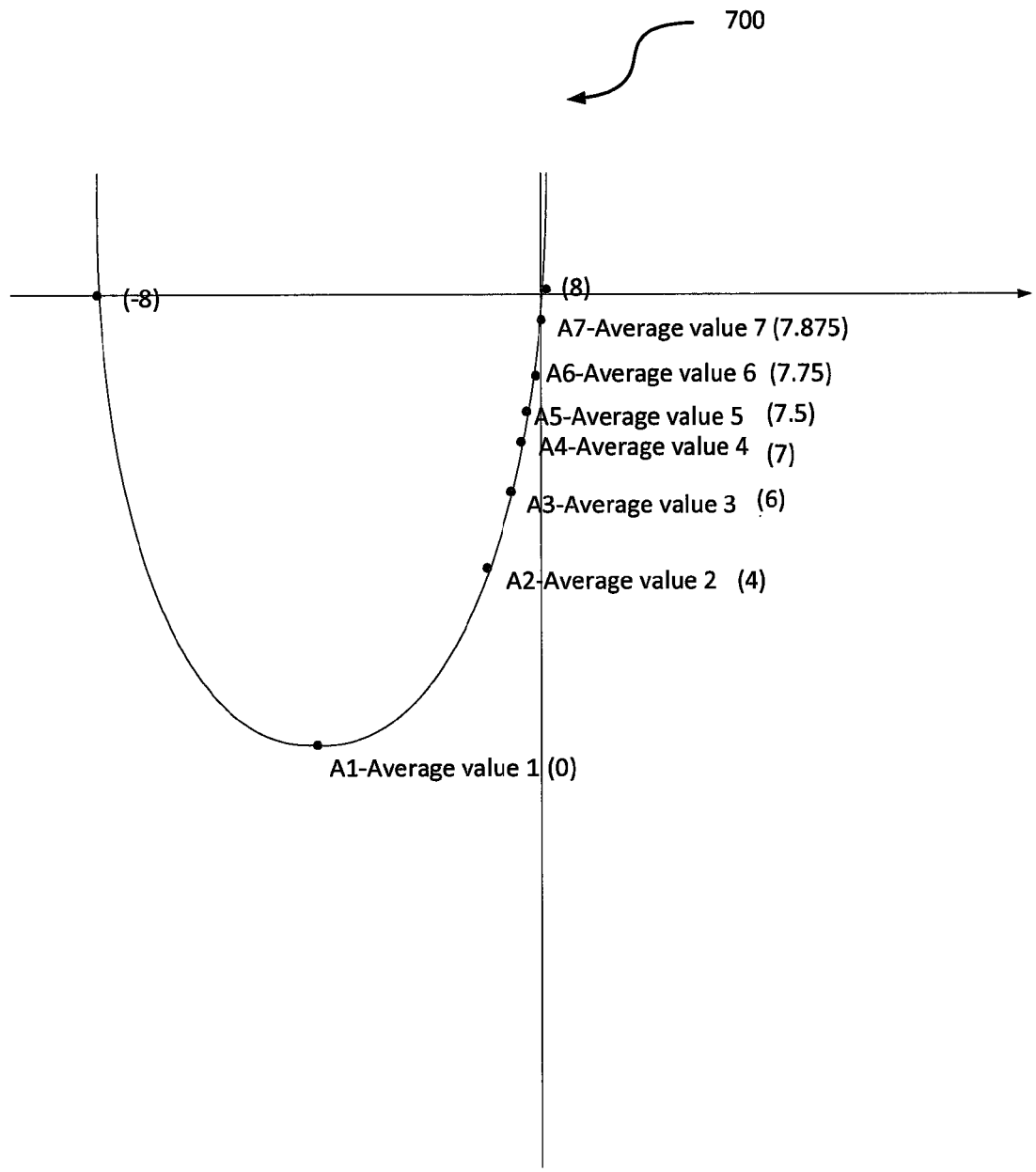
FIG. 7 is a drawing illustrating a binary search algorithm for finding the phase compensation value.

Then both blocks 680A and 680B proceed with block 690, to progressively increase k by 1. In an embodiment shown in FIG. 7, the iteration ends when k>7. However, the predetermined number of times k of iteration may be preset according to an accuracy requirement of the circuit. For example, the target of the iterative binary search algorithm is to find 8 degree as shown in FIG. 7. Iteration may be carried out for 7 times until the value of 7.875 deg is found, which has an accuracy of less than 0.25 deg. The accuracy of the method also depends on the initial value of phase compensation value. For example, the PHASE_CAL_INI_P=8 deg, if the accuracy needs to be smaller than 0.25 deg, then the binary search needs to be carried out for the following number of times:

$$\text{number of times}=\log 10(8/0.125)/\log 10(2)+1=7 \quad (2)$$

FIG. 7 is a drawing illustrating a binary search algorithm for finding the phase compensation value. 8 degree is assigned as the first phase compensation value, and −8 degree is assigned as the second phase compensation value. Then the average phase compensation value is the average of 8 degree and −8 degree, which is 0. Then average 0 and 8, to obtain the second average value 4. After 7 times of calculation, 7.875 is obtained, which is the final optimal phase compensation value. Note 7.875 is a value which is nearest to the Y axis, and has a phase error of less than 0.25 deg.

Figure 8:
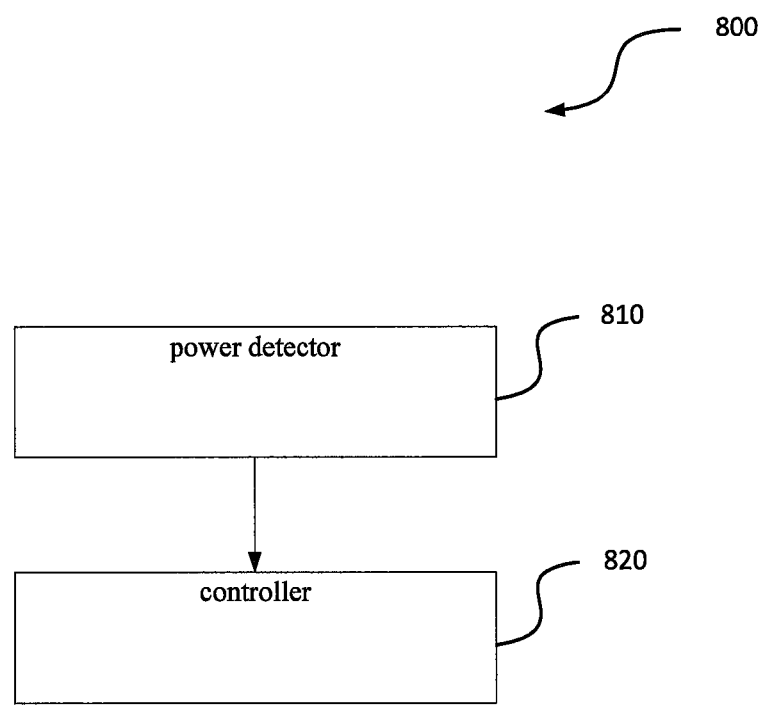
FIG. 8 is a block diagram illustrating an embodiment of a circuit.

FIG. 8 is a block diagram illustrating an embodiment of a circuit 800. The circuit 800 comprises a power detector 810 and a controller 820. The power detector 810 detects power outputs of a first output signal related to a first phase compensation value and of a second output signal related to a second phase compensation value. The a controller 810 calculates a first absolute difference between an in-phase value and a quadrature value of the power output of the first output signal; a second absolute difference between an in-phase value and a quadrature value of the power output of the second output signal; determines a minimum difference by comparing the first absolute difference with the second absolute difference; determines an optimal phase compensation value and a suboptimal phase compensation value from the first and the second phase compensation values according to the minimum difference; and obtains an updated optimal phase compensation value with a binary search algorithm.

Alternatively, in at least an embodiment, the controller 820 further calculates an average phase compensation value of both a current optimal phase compensation value and a current suboptimal phase compensation value; detects a power output of a third output signal related to the average phase compensation value; calculates a third absolute difference between an in-phase value and a quadrature value of the power output of the third output signal; determines an updated minimum difference by comparing the third absolute difference with a previous determined minimum difference; and determines an updated optimal phase compensation value and a suboptimal phase compensation value from the previously determined optimal phase compensation value and the average phase compensation value according to the updated minimum difference.

Alternatively, in at least an embodiment, the power detector 810 further detects power outputs of a first weighted signal which is weighted by the first phase compensation value; detects a power output of a second weighted signal which is weighted by the first phase compensation value; detects a power output of a third weighted signal which is weighted by the first phase compensation value; detects a power output of a fourth weighted signal which is weighted by the first phase compensation value; and the controller 820 further calculates the in-phase value of the power output of the first output signal is implemented by adding the power output of the first weighted signal and the power output of the second weighted signal; and calculates the quadrature value of power output of the first output signal is implemented by adding the power output of the third weighted signal and the power output of the fourth weighted signal.

Alternatively, in at least an embodiment, the power detector 810 further detects a power output of a fifth weighted signal which is weighted by the second phase compensation value; detects a power output of a sixth weighted signal which is weighted by the weighted second phase compensation value; detects a power output of a seventh weighted signal which is weighted by the second phase compensation value; detects a power output of a eighth weighted signal which is weighted by the second phase compensation value. The controller 820 further calculates the in-phase value of the power output of the second output signal by adding the power output of the fifth weighted signal and the power output of the sixth weighted signal; calculates the quadrature value of power output of the second output signal by adding the power output of the seventh weighted signal and the power output of the eighth weighted signal.

Alternatively, in at least an embodiment, the controller 820 further weighs an in-phase branch of a first signal to be compensated with a constant and weighing an quadrature branch of the first signal to be compensated with a negative of the constant; and weighs the in-phase branch of the first signal to be compensated with a negative of the constant and weighing the quadrature branch of the first signal to be compensated with the constant; weighs an in-phase branch of the first signal to be compensated with the constant and weighing an quadrature branch of the first signal to be compensated with the constant; and weighs the in-phase branch of the first signal to be compensated with the negative of the constant and weighing the quadrature branch of the first signal to be compensated with the negative of constant.

Alternatively, in at least an embodiment, the controller 820 further weighs an in-phase branch of a second signal to be compensated with a constant and weighing an quadrature branch of the second signal to be compensated with a negative of the constant; weighs the in-phase branch of the second signal to be compensated with a negative of the constant and weighing the quadrature branch of the second signal to be compensated with the constant; weighs an in-phase branch of the second signal to be compensated with the constant and weighing an quadrature branch of the second signal to be compensated with the constant; and weighs the in-phase branch of the second signal to be compensated with the negative of the constant and weighing the quadrature branch of the second signal to be compensated with the negative of constant.

Alternatively, in at least an embodiment, the controller 820 compensates a phase imbalance between an in-phase and a quadrature branch of the signal based on the phase compensation value.

To be more specific, the controller 820 multiplies the quadrature branch of the signal with a factor denoted as ty2, wherein $ty2 = 1 + \frac{1}{2}*(phase\_comp^2) + \frac{3}{8}*(phase\_comp^4)$, wherein the phase_comp represents the phase compensation value.

For example, a compensated in-phase branch of the signal to be compensated keeps unchanged, the compensated quadrature branch of the signal to be compensated equals $I*phase\_comp + Q)*ty2$, wherein I represents detected in-phase branch value, and Q represents detected quadrature branch value.

Alternatively, in at least an embodiment, the controller 820 further presets the predetermined times according to an accuracy requirement of the circuit.

Figure 9:
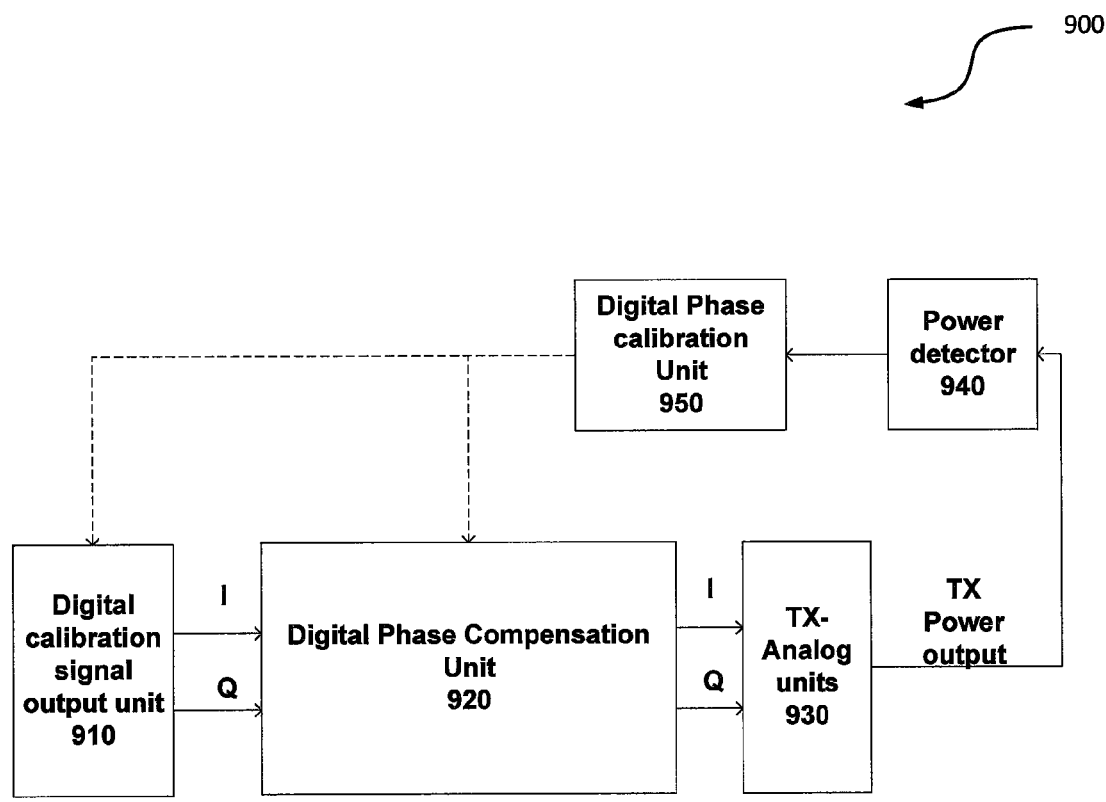
FIG. 9 is a block diagram illustrating a detailed embodiment of a circuit.

FIG. 9 is a block diagram illustrating a detailed embodiment of a circuit 900. The circuit 900 comprises a Digital calibration signal output unit 910, a digital Phase Compensation Unit 920, a TX-Analog units 930, a Power detector 940 and a Digital Phase calibration Unit 950. The Digital calibration signal output unit 910 is connected with the Digital Phase Compensation Unit 920 to output an I branch signal and a Q branch signal. The Digital Phase Compensation Unit 920 is connected to the TX-Analog units 930 to output compensated I branch signal and a Q branch signal. The TX-Analog units 930 is connected to the Power detector 940 to transmit output power. The Power detector 940 is connected to the Digital Phase calibration Unit 950. In FIG. 9, the dotted line comprises control signal channel, while the solid line comprises compensation signal channel. Referring back to FIG. 8, the power detector 810 is similar to the power detector 940 in FIG. 9, and the controller 820 in FIG. 8 comprises the Digital Phase Compensation Unit 920 and the digital phase calibration unit 950.

Figure 10:
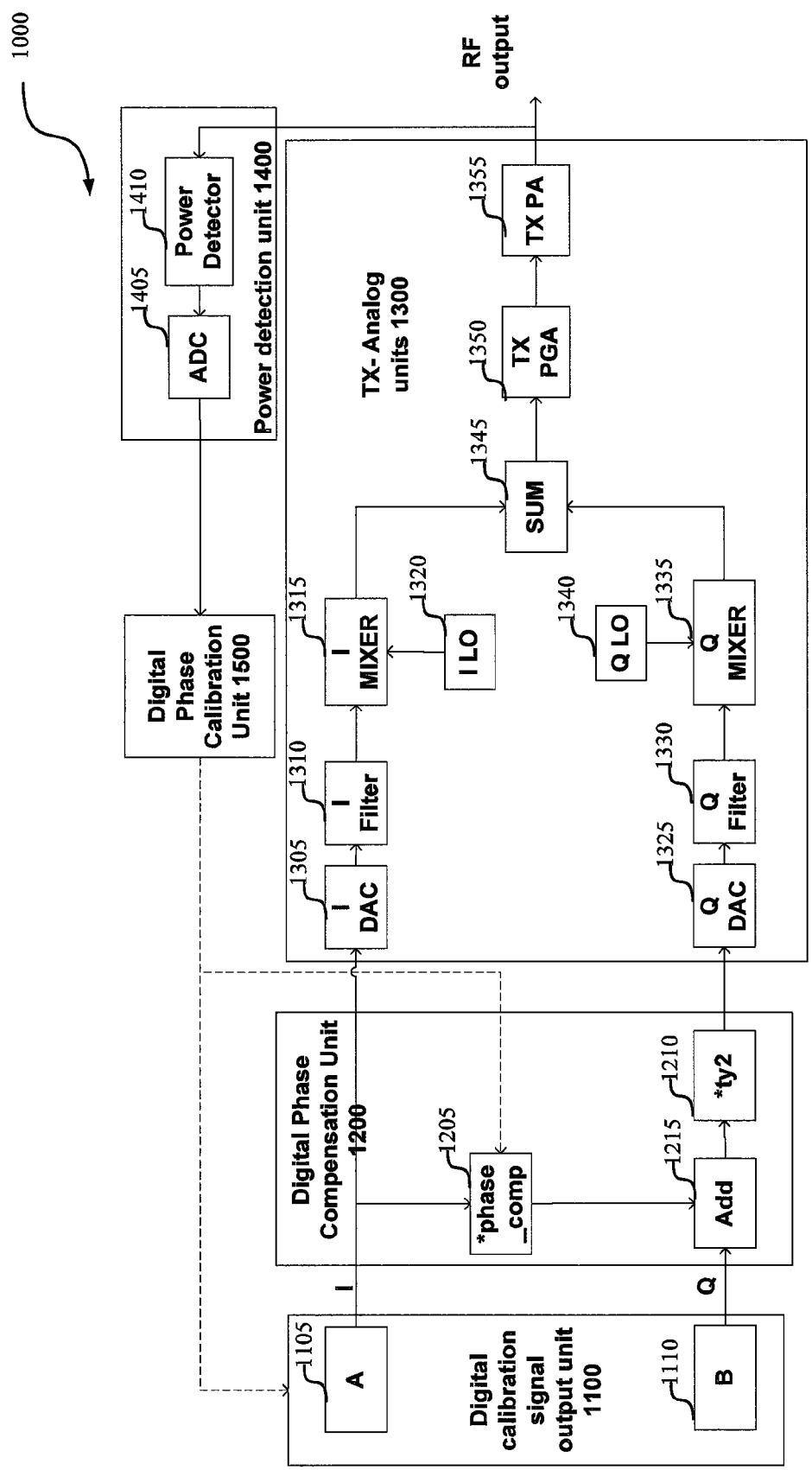
FIG. 10 is a block diagram illustrating a more detailed embodiment of a circuit.

FIG. 10 is a block diagram illustrating a more detailed embodiment of a circuit 1000. The circuit 1000 comprises a Digital calibration signal output unit 1100, a digital Phase Compensation Unit 1200, a TX-Analog units 1300, a Power detector 1400 and a Digital Phase calibration Unit 1500, which are respectively similar to the Digital calibration signal output unit 910, the digital Phase Compensation Unit 920, the TX-Analog units 930, the Power detector 940 and the Digital Phase calibration Unit 950 shown in FIG. 9.

To be specific, as shown in FIG. 10, the Digital calibration signal output unit 1100 comprises two modules 1105 and 1110, which respectively output the constant A and constant B. The constant A is applied to an I (In-phase) branch of the phase signal to be compensated. The constant B is applied to a Q (Quadrature) branch of the phase signal to be compensated. The constant A and constant B are the same as those shown in each of FIGS. 2A, 2B, 3A and 3B. The Digital Phase Compensation Unit 1220 comprises two multipliers, namely, *phase_comp multiplier 9205 and *ty2 multiplier 1210, and an adder 1215. The equation for calculating ty2 can refer to the above equation (1). The compensated signal of Q branch can be represented as $(Q_{detected} + I_{detected}*phase\_comp)*ty2$. $Q_{detected}$ and $I_{detected}$ refer to detected quadrature signal and in-phase signal. Phase_comp is the phase compensation value, or phase error, which has a unit of radian. The function of Adder 9215 is to add $Q_{detected}$ to $I_{detected}*phase\_comp$.

The TX_Analog units 1300 comprises an I DAC 1305, which includes a 9-bit in-phase path Digital-to-Analog converter, an I Filter 1310, which includes an in-phase path low pass filter, an I mixer 1315, and an I LO, which includes an in-phase path local oscillator, and these units are connected in sequence. The TX_Analog units 1300 further comprises a Q DAC 1325, which includes a 9-bit quadrature path Digital-to-Analog converter, a Q Filter 1330, which includes a quadrature low pass filter, a Q mixer 1335, and an Q LO, which includes a quadrature local oscillator, and these units are connected in sequence. The I mixer 1315 and the Q mixer 1335 are both connected to an SUM 1345. The TX_Analog units 1300 further comprises a TX PGA 1350, which may include a transmitter programmable gain amplifier, and a TX PA 1355, which may include a transmitter power amplifier, and the two units are connected to each other.

The power detection unit 1400 may include an analog to digital converter (ADC), for example 8-bit ADC, and a power detector 1410 which are connected in series.

The Digital Phase Calibration Unit 1500 is used to process and control digital signals.

In operation, the circuit 1000 first initiates the TX-Analog units 1300 and the Power detection unit 1400. Then the Digital Phase Calibration Unit 1500 controls the whole compensation/calibration process. It uses dichotomy or also named a binary search algorithm to control Digital calibration signal output unit 1100, the Digital Phase Compensation Unit 1200, and to calculate the value detected by the Power detection unit 1400. According to an embodiment of the invention, system simulation and practical test show that the method can obtain a final phase imbalance within 0.25 degree, which satisfy the requirements by Wi-Fi and other systems.

It should be appreciated by those skilled in the art that components from different embodiments may be combined to yield another technical solution. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although the present invention has been described with reference to specific exemplary embodiments, the present invention is not limited to the embodiments described herein, and it can be implemented in form of modifications or alterations without deviating from the spirit and scope of the appended claims. Accordingly, the description and the drawings are to be regarded in an illustrative rather than a restrictive sense.

From the foregoing, it will be appreciated that specific embodiments of the technology have been described herein for purposes of illustration, however various modifications can be made without deviating from the spirit and scope of the present invention. Accordingly, the present invention is not restricted except in the spirit of the appended claims.

Other variations to the disclosed embodiments can be understood and effected by those skilled in the art in practicing the claimed invention, from a study of the drawings, the disclosure, and the appended claims. In the claims the word "comprising" does not exclude other elements or steps, and the indefinite article "a" or "an" does not exclude a plurality. Even if particular features are recited in different dependent claims, the present invention also relates to the embodiments including all these features. Any reference signs in the claims should not be construed as limiting the scope.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

What is claimed is:

1. A circuit for compensating phase imbalance, comprising:
    a first multiplier and a second multiplier respectively configured to output an in-phase branch signal and a quadrature branch signal related to a power signal;
    a phase compensator connected to the first multiplier, an adder connected to the phase compensator and the second multiplier, and a third multiplier connected to the adder, wherein the phase compensator is configured to generate a compensated in-phase branch signal using a phase compensation value, the adder is configured to generate an addition result by adding the compensated in-phase branch signal with the quadrature branch signal, and the third multiplier is configured to generate a compensated quadrature branch signal by multiplying the addition result with a factor, and output the compensated quadrature branch signal;
    an in-phase path digital-to-analog converter, an in-phase path low pass filter, an in-phase mixer, and an in-phase path local oscillator connected in sequence with the first multiplier and configured to output a mixed in-phase signal based on the in-phase branch signal,
    a quadrature path digital-to-analog converter, a quadrature low pass filter, a quadrature mixer, and a quadrature local oscillator connected in sequence with the third multiplier and configured to output a mixed quadrature branch signal based on the compensated quadrature branch signal,
    a summator connected to both the in-phase mixer and the quadrature mixer, a transmitter programmable gain amplifier connected to the summator, and a transmitter power amplifier connected to the programmable gain amplifier, wherein the transmitter power amplifier is configured to generate an output signal based on the mixed in-phase branch signal and the mixed quadrature branch signal;
    a power detector connected to the transmitter power amplifier and configured to detect a power of the output signal;
    a digital phase calibrator connected to the power detector and the phase compensator, and configured to instruct the phase compensator to iteratively use a plurality of phase compensation values, and obtain an optimal phase compensation value with a minimum difference among the plurality of phase compensation values;
    wherein the transmitter power amplifier is further configured to output an output signal corresponding to the optimal phase compensation.

2. A circuit of claim 1, wherein:
    the power detector is further configured to detect power outputs of a first output signal related to a first phase compensation value and of a second output signal related to a second phase compensation value;
    the digital phase calibrator is further configured to
        calculate a first absolute difference between an in-phase value and a quadrature value of the power output of the first output signal;
        calculate a second absolute difference between an in-phase value and a quadrature value of the power output of the second output signal;
        determine a minimum difference by comparing the first absolute difference with the second absolute difference;
        determine an optimal phase compensation value and a suboptimal phase compensation value from the first and the second phase compensation values according to the minimum difference; and obtain an updated optimal phase compensation value with a binary search algorithm.

3. The circuit of claim 2, wherein the digital phase calibrator is further configured to compensate a phase imbalance between an in-phase and a quadrature branch of the signal based on the phase compensation value.

4. The circuit of claim 3, wherein the third multiplier is further configured to multiply the quadrature branch of the signal to be compensated with a factor denoted as ty2, wherein $ty2=1+\frac{1}{2}*(phase\_comp^2)+\frac{3}{8}*(phase\_comp^4)$, wherein the phase_comp represents the phase compensation value.

5. The circuit of claim 4, wherein a compensated in-phase branch of the signal to be compensated keeps unchanged, the compensated quadrature branch of the signal to be compensated equals $(I*phase\_comp+Q)*ty2$, wherein I represents detected in-phase branch value, and Q represents detected quadrature branch value.

6. The circuit of claim 2, wherein the digital phase calibrator and the power detector are further configured to iteratively perform the following operations for a predetermined number of times:

calculating an average phase compensation value of both a current optimal phase compensation value and a current suboptimal phase compensation value;

detecting a power output of a third output signal related to the average phase compensation value;

calculating a third absolute difference between an in-phase value and a quadrature value of the power output of the third output signal;

determining an updated minimum difference by comparing the third absolute difference with a previous determined minimum difference; and determining an updated optimal phase compensation value and a suboptimal phase compensation value from the previously determined optimal phase compensation value and the average phase compensation value according to the updated minimum difference.

7. The circuit of claim 6, the digital phase calibrator is further configured to preset the predetermined times according to an accuracy requirement of the circuit.

8. The circuit of claim 2 wherein the power detector is further configured to:
detect power outputs of a first weighted signal which is weighted by the first phase compensation value;
detect a power output of a second weighted signal which is weighted by the first phase compensation value;
detect a power output of a third weighted signal which is weighted by the first phase compensation value;
detect a power output of a fourth weighted signal which is weighted by the first phase compensation value; and the digital phase calibrator is further configured to:
calculate the in-phase value of the power output of the first output signal is implemented by adding the power output of the first weighted signal and the power output of the second weighted signal; and
calculate the quadrature value of power output of the first output signal is implemented by adding the power output of the third weighted signal and the power output of the fourth weighted signal.

9. The circuit of claim 3 wherein the power detector is further configured to:
detecting a power output of a fifth weighted signal which is weighted by the second phase compensation value;
detecting a power output of a sixth weighted signal which is weighted by the weighted second phase compensation value;
detecting a power output of a seventh weighted signal which is weighted by the second phase compensation value;
detecting a power output of a eighth weighted signal which is weighted by the second phase compensation value; and the digital phase calibrator is further configured to:
calculate the in-phase value of the power output of the second output signal by adding the power output of the fifth weighted signal and the power output of the sixth weighted signal;
calculate the quadrature value of power output of the second output signal by adding the power output of the seventh weighted signal and the power output of the eighth weighted signal.

10. The circuit of claim 8, wherein:

the the digital phase calibrator is further configured to—
weighing an in-phase branch of a first signal to be compensated with a constant and weighing an quadrature branch of the first signal to be compensated with a negative of the constant; and
weighing the in-phase branch of the first signal to be compensated with a negative of the constant and weighing the quadrature branch of the first signal to be compensated with the constant;
weighing an in-phase branch of the first signal to be compensated with the constant and weighing an quadrature branch of the first signal to be compensated with the constant; and
weighing the in-phase branch of the first signal to be compensated with the negative of the constant and weighing the quadrature branch of the first signal to be compensated with the negative of constant.

11. The circuit of claim 9, wherein the first multiplier and the second multiplier are further configured to— weighing an in-phase branch of a second signal to be compensated with a constant and weighing an quadrature branch of the second signal to be compensated with a negative of the constant;

weighing the in-phase branch of the second signal to be compensated with a negative of the constant and weighing the quadrature branch of the second signal to be compensated with the constant;

weighing an in-phase branch of the second signal to be compensated with the constant and weighing an quadrature branch of the second signal to be compensated with the constant; and weighing the in-phase branch of the second signal to be compensated with the negative of the constant and weighing the quadrature branch of the second signal to be compensated with the negative of constant.

* * * * *